United States Patent
Pool et al.

(10) Patent No.: US 10,267,237 B2
(45) Date of Patent: Apr. 23, 2019

(54) RETURN FLOW POWERED TURBINE

(71) Applicant: Rolls-Royce Corporation, Indianapolis, IN (US)

(72) Inventors: Andrew J. Pool, Indianapolis, IN (US); Joel M. Rubel, Maineville, OH (US); Perry J. Patzer, Avon, IN (US); Stephen E. Hollander, Westfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 491 days.

(21) Appl. No.: 15/067,921

(22) Filed: Mar. 11, 2016

(65) Prior Publication Data

US 2016/0265444 A1   Sep. 15, 2016

Related U.S. Application Data

(60) Provisional application No. 62/131,963, filed on Mar. 12, 2015.

(51) Int. Cl.

| | |
|---|---|
| *F02C 7/26* | (2006.01) |
| *F02C 9/36* | (2006.01) |
| *F02C 9/26* | (2006.01) |
| *F02C 9/38* | (2006.01) |
| *F02C 7/22* | (2006.01) |
| *F02C 7/236* | (2006.01) |

(52) U.S. Cl.
CPC .............. *F02C 9/36* (2013.01); *F02C 7/222* (2013.01); *F02C 7/236* (2013.01); *F02C 9/263* (2013.01); *F02C 9/38* (2013.01); *F05D 2220/62* (2013.01); *F05D 2220/76* (2013.01); *F05D 2270/07* (2013.01)

(58) Field of Classification Search
CPC .......... F02C 7/222; F02C 7/236; F02C 9/263; F02C 9/36; F02C 9/38; F05D 2220/62; F05D 2220/76; F05D 2270/07
See application file for complete search history.

(56) References Cited

U.S. PATENT DOCUMENTS

| | | | | |
|---|---|---|---|---|
| 4,864,815 A | * | 9/1989 | Cygnor | .................. F02C 7/236 60/786 |
| 4,915,593 A | * | 4/1990 | Cygnor | .................. F02C 7/236 417/245 |
| 5,156,001 A | * | 10/1992 | Mouton | .................... F02C 7/14 417/245 |
| 5,513,493 A | | 5/1996 | Severn et al. | |

(Continued)

FOREIGN PATENT DOCUMENTS

WO   WO-2014096620 A1   6/2014

OTHER PUBLICATIONS

Extended European Search Report dated Jul. 20, 2016 issued in European Patent Application No. 16159223.3.

*Primary Examiner* — Jesse S Bogue
(74) *Attorney, Agent, or Firm* — Fishman Stewart PLLC

(57) ABSTRACT

A fuel system for an aircraft is provided having an improved fluid circuit and method of operation. Un-burnt fuel is directed via a return loop towards a fuel tank reservoir. A turbine is located in the return loop and upstream from the fuel tank. The pressurized un-burnt fuel energizes the turbine and the fuel passes to the fuel tank. The turbine is harnessed to a generator for providing a power.

18 Claims, 2 Drawing Sheets

(56) References Cited

U.S. PATENT DOCUMENTS

| | | | |
|---|---|---|---|
| 6,591,926 B2 * | 7/2003 | Oglesby | F02B 43/10 |
| | | | 429/444 |
| 7,664,590 B2 | 2/2010 | Runkle et al. | |
| 7,726,112 B2 | 6/2010 | Dooley | |
| 7,845,177 B2 | 12/2010 | Parsons | |
| 7,954,310 B2 | 6/2011 | Nest | |
| 2005/0166573 A1 | 8/2005 | Hommema | |
| 2011/0107739 A1 * | 5/2011 | Shimizu | F01N 3/2006 |
| | | | 60/273 |
| 2014/0096620 A1 | 4/2014 | Perrin et al. | |
| 2014/0250891 A1 * | 9/2014 | Evans, Jr. | F02M 21/0212 |
| | | | 60/698 |
| 2014/0373531 A1 * | 12/2014 | Wong | F02B 43/02 |
| | | | 60/605.1 |
| 2015/0315971 A1 * | 11/2015 | Reitz | B64D 37/34 |
| | | | 60/39.461 |

* cited by examiner

RETURN FLOW POWERED TURBINE

CROSS-REFERENCE TO RELATED APPLICATIONS

This application claims priority to U.S. Provisional Patent Application No. 62/131,963 filed on Mar. 12, 2015, the contents of which are hereby incorporated by reference in its entirety.

FIELD OF TECHNOLOGY

The present disclosure relates to an improved fuel system for an engine, and, in particular, an improved fuel system for use in connection with a gas turbine engine whereby un-burnt fuel is directed to a turbine where the energy is harnessed via a generator.

BACKGROUND

Aircraft employ a variety of engines, for example gas turbine engines, which typically include a fuel system for supplying fuel from a fuel source to a combustor where the fuel in combination with compressed air is ignited to produce combustion gasses to drive the engine's turbine system. The fuel system typically includes pumps, valves and regulators so as to assure proper fuel pressure is maintained for delivering ample pressurized fuel supply to the engines. Traditional fuel systems may supply either a constant flow or a varied flow rate of fuel to the engine which in a large part is determined by the pumps that are employed within the fluid delivery circuit. Based upon the system employed, different performance characteristics can be achieved.

One such example of a fuel system employs a gear pump which provides a constant flow rate of fuel at a given pump speed. The constant flow pump delivers the same amount of fuel irrespective of the current demand on the engine. In such scenarios, the fuel pump(s) deliver excessive amounts of fuel to the engine, which results in un-burnt fuel having to be recirculated within the system or to be exhausted to the atmosphere. It is ecologically undesirable to exhaust the un-burnt fuel to the environment so reclaiming the fuel is preferred. This scenario results in energy inefficiencies, increased friction, and increased heat transfer loads. It would be preferable to avoid these problems.

Once such arrangement to accommodate the un-burnt fuel within a fuel pumping circuit would be to redirect the un-burnt fuel to a gear pump and reintroduce it into the fluid delivery circuit, which in turn delivers the fuel to the engine where it may be combusted. Such arrangements sometimes employ additional pumps, valves and devices which increase weight and overall inefficiencies. Further, such systems tend to reintroduce the un-burnt fuel into the fresh fuel supply loop. The un-burnt fuel, however, is in a heightened temperature state because of the friction generated as a result of it already having been pumped once. Thus, if the un-burnt heated fuel is mixed with the ambient temperature fuel that is normally present in the supply line, then the resulting mixed fuel takes on an elevated temperature. Due to the fact that fuel pumps are not 100% efficient, each pass through the pump causes additional energy loss. Additionally, because fuel is sometimes used for tasks such as taking heat out of engine oil through heat exchangers, heating the fuel unnecessarily through the pumping process is undesired as it reduces the capacity of the fuel to extract heat from the engine oil.

In addition, when the un-burnt fuel is recirculated by introducing it to a traditional constant flow pump, such arrangement typically requires larger pumps to handle the increased fuel flow rate. As such when larger pumps are employed, weight and costs are added to the aircraft's fuel system. Thus, it would be helpful to avoid increased pumping requirements, avoid heavy pumps and other components, and avoid introducing the heated un-burnt fuel directly back into the fresh fuel supply loop.

It would be helpful to address the concerns raised herein by providing an improved fluid circuit reducing the weight of the fluid pumping system, and even harnessing the energies from the un-burnt fuel so as to redirect those energies to a more effective purpose with the engine.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

The present disclosure provides an enhanced aircraft fuel system that captures the energy from un-burnt fuel by introducing it to a turbine which in turn is harnessed to a generator. The generator may then supply power to systems within the aircraft that require power. A return loop within the fuel system delivers un-burnt fuel which is heated and pressurized. The turbine is positioned upstream from a fuel tank. The turbine extracts energy which in turn powers a shaft and energizes a generator. The generator provides electrical power to electrical components of the aircraft. The turbine then dispenses with the un-burnt fuel by directing same into the fuel tank.

An exemplary method of operating an improved fuel system for a gas turbine engine is provided. One such exemplary method includes providing a first supply loop of fuel where pressurized fuel is delivered to an engine. A second return fuel loop is provided which directs un-burnt pressurized heated fuel to a turbine where power is extracted from the kinetic energy that is generated by the pressurized heated un-burnt fuel. The un-burnt fuel may then be delivered to a fuel reservoir or tank 50 where it is combined with fresh fuel 48 which collectively may then be later circulated to the supply loop 52. The process then repeats itself.

Figure 1:
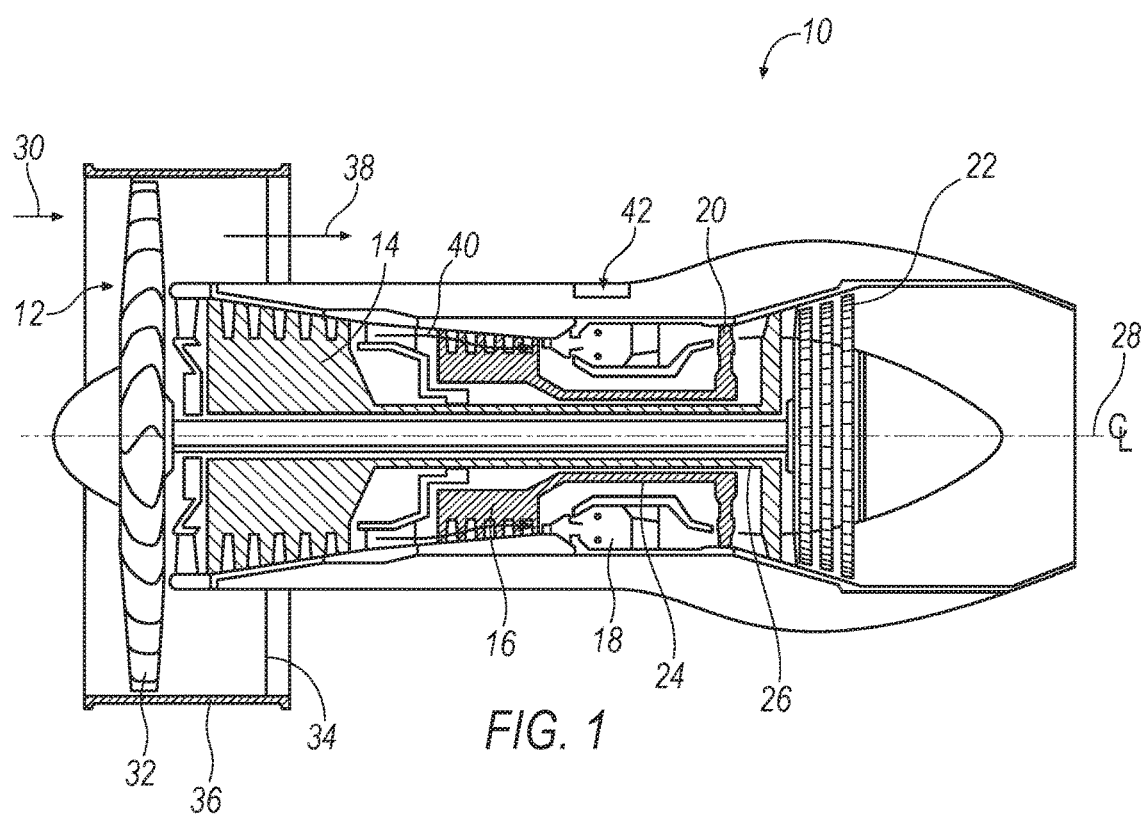
FIG. 1 illustrates a gas turbine engine as one example of where the present disclosure may be utilized.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively.

The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 that is located within an annular duct 34, which in part is circumscribed by fan case 36 that extends axially. The ambient air 30 is separated into a bypass airflow stream 38 and primary gas stream 40. The bypass airflow stream 38 provides engine thrust while the primary gas stream 40 is directed to the combustor 18 where it is mixed with fuel and combusted and then directed to the high pressure turbine 20 for generating thrust. The gas turbine engine 10 further includes an improved fuel system 42 that is located approximate to the casing of the engine 10. It will be appreciated that the fuel system 42 may be located in various places in an aircraft (not shown), for example in the fuselage, wings, etc.

Figure 2:
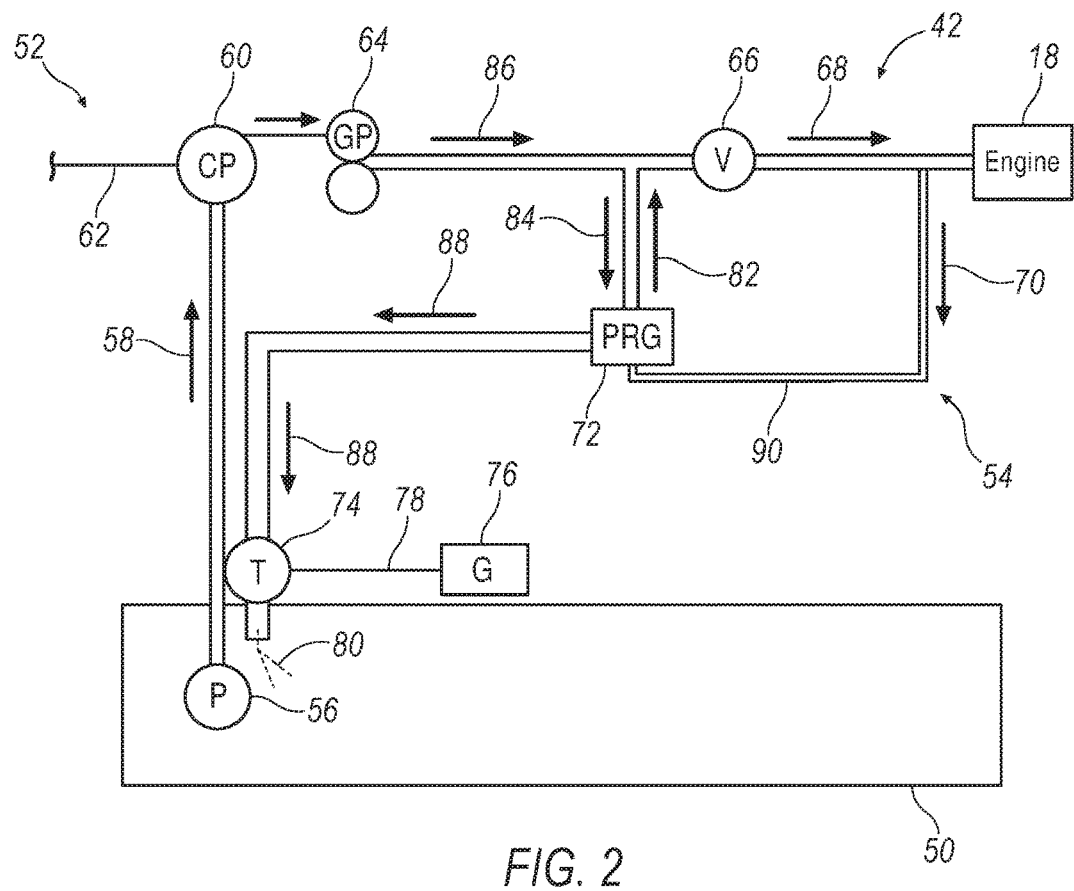
FIG. 2 illustrates an exemplary fluid circuit for use in connection with a gas engine.

FIG. 2 illustrates an exemplary fuel system 42 that may be employed with the gas turbine engine 10 as depicted in FIG. 1. An exemplary fuel logic circuit is depicted and it will be appreciated that the circuit may employ more, different or fewer components without departing from the scope of the disclosure herein. The fuel system 42 includes fuel 48 located in a fuel reservoir or tank 50, a pressurized supply line circuit or loop 52, and a return line circuit or loop 54 that is operable to return un-burnt fuel 84 to the tank 50. The engine 10 has a combustor 18 that is operable to receive the pressurized fuel from the supply loop 52. The pressurized fuel is mixed with air where it is ignited to produce superheated pressurized air to propel the turbines 20, 22.

The fuel tank 50 has a booster pump 56 located within the tank 50 for providing pressurized fuel to the supply loop 52. Pressurized fuel leaves the tank 50 and travels the supply loop 52 in the direction of arrow 58 where the pressurized fuel is delivered to a centrifugal pump 60 which may be low pressure. The centrifugal pump 60 may be powered by a shaft 62 which may be driven by an alternative energy source, not disclosed herein. The centrifugal pump 60 aids and provides continuous fuel flow downstream of the fuel tank 50 which sometimes may be helpful when the fuel tank 50 is not located proximal to the combustor 18.

Downstream from the low pressure centrifugal pump 60 can be a high pressure gear pump 64 which provides high pressurized un-burnt fuel further downstream and to the inlet side of the combustor 18. The gear pump 64 may be mounted more proximate to the combustor 18 than the fuel tank 50 and it is operable to provide a constant supply of pressurized un-burnt fuel to the combustor 18. The high pressure gear pump 64 may be a constant flow pump and it could be sized to provide a steady state flow of un-burnt fuel. The pump 64 is located downstream from the centrifugal pump 60 and it is positioned on the up-stream side of the combustor 18. The metering valve 66 throttles the pressurized fuel so that a predetermined volume of pressurized fuel, at a predetermined pressure rate, flows to the combustor 18.

The fuel system 42 provides a steady flow 68 of pressurized fuel to the inlet side of the combustor 18. However, it will be appreciated that as the engine 10 conditions change, the fuel flow demanded by the combustor 18 may change as well. Under this scenario, not all of the steady flow of fuel 68 being delivered to the engine is consumed nor is it needed. This results in a backflow of un-burnt fuel which needs to be redirected. Under these circumstances, it is helpful to redirect the fuel 68 away from the combustor 18 and towards the fuel tank 50.

The return loop 54 includes a pressure regulating valve (PRV) 72. A turbine 74 is positioned within the return loop 54 for capturing the pressure energy resulting from the pressurized heated un-burnt fuel where the kinetic energy is transferred to a turbine. A generator 76 is connected via a shaft 78 to the turbine 74. The shaft 78 transfers the energy that is harnessed from the turbine 74 by directing the energy to the generator 76. After the turbine 74 extracts the energy from the un-burnt fuel 70, the un-burnt fuel exits 80 the turbine outlet flow path.

With continued reference to FIG. 2, the pressure regulating valve 72 has an inlet for receiving the un-burnt fuel 84. The pressure regulating valve 72 maintains a constant pressure drop across the metering valve 66 by balancing the pressure of the un-burnt fuel 84 with the pressure of the fuel being provided to the combustor 90. This ensures that the metering valve provides a known amount of fuel to the combustor 18 for a given opening. When the metering valve 66 receives more fuel from the high pressure pump 64 than it needs, it will direct the remainder of the un-burnt fuel 84 through the pressure regulating valve 72. Fuel in turn is then directed from the pressure regulating valve (PRG) 72 in a direction downstream 88 and towards the fuel tank 50. Dead headed fuel may bypass the combustor 18 along path 70 to the back side 90 of the PRV 72. The metering valve 66 has an outlet line 67 which is connected to another system such as a power motor, linkages, etc.

Figure 3:
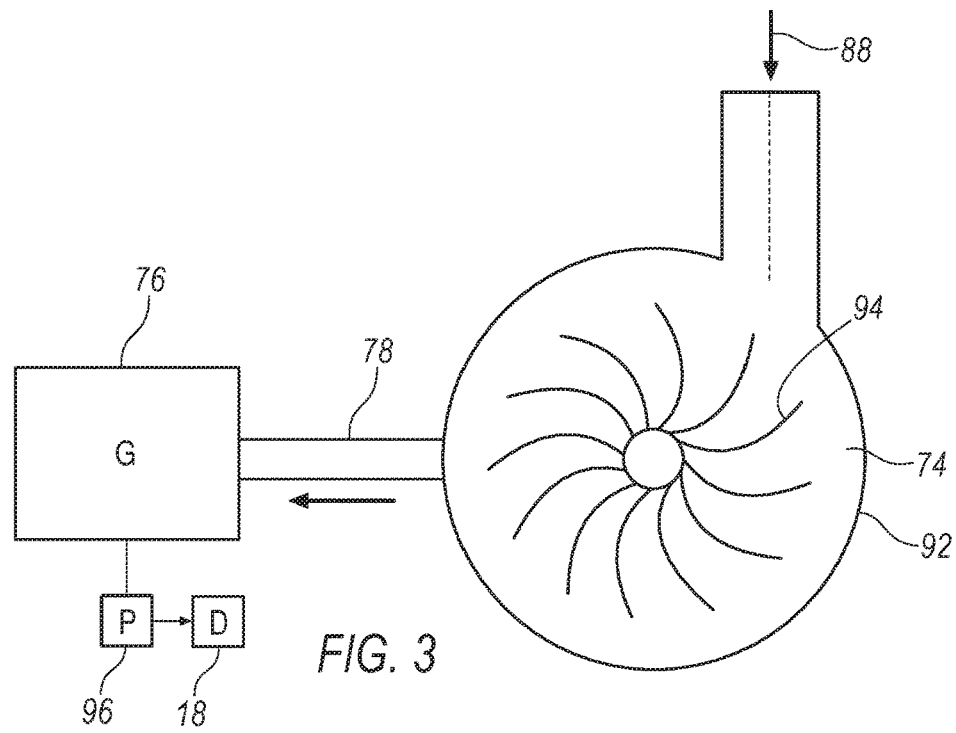
FIG. 3 illustrates a schematic diagram of a portion of the fuel return loop, and illustrating a turbine used in connection with a generator.

FIG. 3 illustrates a schematic diagram of the turbine 74 that may be used in the fluid system 42 that is shown in FIG. 2. The turbine 74 receives the recovered downstream fuel 88 which is heated and pressurized. This fuel contains kinetic energy that is introduced into the housing 92 of the turbine 74. A set of turbine blades 94 turn a shaft 78 which in turn is in communication with a generator 76. The generator 76 in turn provides power 96 to powerable devices 98. An example of the powered devices 98 could include the booster pump 56, a weapons system, sensors, and a host of other devices on aircraft that consume power. Thus, they together form a power system that works in concert with the fuel system of the gas turbine 10.

It will be appreciated that other harnessing devices, apart from the turbine 74, are contemplated within the disclosure herein. It will be appreciated that the turbine 74 can be modified to provide other benefits apart from harnessing the energy of the un-burnt fuel 70.

With reference to FIG. 2, a method of operating the improved fuel system for a gas turbine engine will now be presented. A supply of fuel 48 is stored in a tank 50 at a predetermined location on an aircraft. Within the tank 50 is a booster pump 56 that is pressurized to advance pressurized fuel 58 to another pumping means. A low pressure centrifugal pump 60 could be employed if long distances are required to traverse in order to advance the fuel to the combustor 18. The high pressure pump 64 may be operated at speeds commensurate with the RPMs of the engine to as to supply a pressurized flow 86 of fuel downstream of the tank 50. The metering valve 66 throttles pressurized fuel 68 which in turn is delivered to a combustor 18 of the engine. As the engine oscillates between engine demand requirements, a certain level of backflow of un-burnt fuel 84 is introduced to a return fuel loop 54. The un-burnt fuel 84 is introduced to a pressure regulating valve 72. The pressure regulating valve 72, while balancing the pressure drop across metering valve 66 by using reference fuel pressure 90, based upon demand requirements, may direct fuel flow downstream towards the tank 50. A flow of downstream un-burnt fuel 88 is then redirected to the turbine 74 where the turbine is propelled by the un-burnt fuel causing the generator 76 to provide power 96. Various devices 98 may be powered by the generator 76 and the level of power 96 that is available, may fluctuate based upon engine operating conditions. The fuel is then exited from the turbine 74 and is delivered to the tank 50. The un-burnt fuel then is mixed with the pre-existing fuel 48 that is in the tank 50 where the cycle may be repeated by fuel being pushed through the booster pump 56 and back into the supply loop 52.

The fuel system 42 has a high pressure side loop 52 and a lower pressure side or return loop 54. The high pressure side loop 52 and the lower pressure side loop 54 will have the pressures therein modulate based upon the demand on the engine. During high engine demand events, there may be reduced fuel flow in the return loop 54, which in turn results in less power output 96. By contrast, during engine idle scenarios, it is contemplated that a large supply of un-burnt fuel 84 will be directed to the return loop 54, thus causing the turbine 74 to spike resulting in an increase power 96 output via the generator 76. Thus, the fuel system 42 is a dynamic on demand system having a return flow powered turbine system 100 that is operable to provide varied power 96.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A fluid circuit for providing fuel to a gas turbine engine comprising:
    a fuel supply tank;
    a pressurized fuel supply circuit that receives fuel stored in the fuel supply tank and delivers pressurized fuel to a combustor;
    a return fuel circuit that redirects un-burnt fuel away from the combustor and towards the fuel supply tank;
    a pressure regulating valve (PRV) disposed within the return fuel circuit for controlling fuel flow within the return fuel circuit;
    a turbine disposed within the return fuel circuit downstream of the PRV and upstream of the fuel supply tank; and
    a metering valve disposed within the fuel supply circuit, wherein the return fuel circuit is connected to the fuel supply circuit upstream of the metering valve to redirect un-burnt fuel away from the combustor, and the return fuel circuit is connected to the fuel supply circuit downstream of the metering valve via a bypass path that delivers un-burnt fuel away from the combustor and towards the fuel supply tank.

2. The fluid circuit as claimed in claim 1, further comprising at least one pump located within the fuel supply circuit for advancing pressurized fuel towards the combustor.

3. The fluid circuit as claimed in claim 1, wherein the PRV has an inlet communicating with the fuel supply circuit upstream of the metering valve and another inlet communicating with the fuel supply circuit downstream of the metering valve via the bypass path, the PRV structured and arranged to redirect a flow of un-burnt fuel downstream towards the turbine.

4. The fluid circuit as claimed in claim 1, further comprising a generator that is powered by the turbine, the generator has an output that provides electrical power to a power using device when the turbine is propelled by the un-burnt fuel received from the return fuel circuit.

5. The fluid circuit as claimed in claim 4, further comprising a shaft connecting an output of the turbine to the generator, and wherein the turbine has an outlet for delivering un-burnt fuel to the fuel supply tank.

6. The fluid circuit as claimed in claim 5, further comprising a low pressure pump disposed in the fuel supply circuit downstream of the fuel supply tank and a high pressure pump disposed in the fuel supply circuit downstream of the low pressure pump.

7. The fluid circuit as claimed in claim 6, further comprising a booster pump disposed within the fuel supply tank for providing pressurized fuel to the fuel supply circuit.

8. A gas turbine engine comprising the fluid circuit as claimed in claim 1, wherein the pressurized un-burnt fuel propels the turbine.

9. A fuel system for providing fuel to a power plant comprising:
    a fuel tank;
    a fuel supply line that delivers pressurized fuel stored in the fuel tank to a combustor;
    a return fuel line that redirects un-burnt fuel away from the combustor and towards the fuel tank;
    a metering valve disposed in the fuel supply line;
    a turbine located within the return fuel line upstream of the fuel tank, the turbine having an inlet that receives a flow of un-burnt fuel conveyed through the return fuel line and an outlet that delivers un-burnt fuel to the fuel tank;
    a generator operably connected to the turbine, the generator having an output that provides electrical power to a power consuming device;
    wherein the turbine is propelled by the flow of un-burnt fuel and energizes the generator for providing electrical power to the power consuming device; and
    wherein the return fuel line is connected to the fuel supply line upstream of the metering valve to redirect un-burnt fuel away from the combustor, and wherein the return fuel line has a bypass path connected to the fuel supply line downstream of the metering valve that delivers un-burnt fuel away from the combustor and towards the fuel tank.

10. The fuel system as claimed in claim 9, further comprising a pressure regulating valve (PRV) disposed within the return fuel line and that controls fuel flow within the return fuel line, the PRV having a port that receives un-burnt fuel from the fuel supply line upstream of the metering valve and another port that receives un-burnt fuel via the bypass path from the fuel supply line downstream of the metering valve, and wherein the PRV is disposed upstream of the turbine.

11. The fuel system as claimed in claim 10, wherein the PRV is structured and arranged to direct the un-burnt fuel downstream to the turbine based on demand requirements of the power plant.

12. The fuel system as claimed in claim 9, wherein the turbine is connected to the generator via a shaft and has an output for delivering power to the shaft when the turbine is propelled by the flow of un-burnt fuel.

13. The fuel system as claimed in claim 9, further comprising a first pump and a second pump disposed in the fuel supply line downstream of the fuel tank, the second pump disposed downstream of the first pump and upstream of the metering valve, wherein the metering valve receives pressurized fuel from the second pump.

14. A method of generating electrical power from a fuel circuit comprising the following steps:
supplying fuel to a fuel supply line;
pressurizing the fuel within the fuel supply line;
throttling pressurized fuel via a metering valve disposed in the fuel supply line so fuel flow and pressure is at a predetermined value;
introducing fuel via the fuel supply line into an engine;
redirecting un-burnt fuel from the fuel supply line to a return fuel line where a turbine is propelled;
creating power with the turbine; and
exiting the un-burnt fuel from turbine to a reservoir;
wherein redirecting un-burnt fuel from the fuel supply line to the return fuel line includes directing a flow of the un-burnt fuel to the return fuel line from the fuel supply line upstream of the metering valve and guiding a bypass flow of the un-burnt fuel to the return fuel line from the fuel supply line downstream of the metering valve.

15. The method of generating electrical power as claimed in claim 14, wherein creating power with the turbine includes the turbine powering a generator which in turn outputs electrical power.

16. The method of generating electrical power as claimed in claim 14, further comprising the step of regulating the fuel pressure in the return fuel line.

17. The method of generating electrical power as claimed in claim 14, wherein the step of redirecting un-burnt fuel from the fuel supply line to the return fuel line further includes introducing the un-burnt fuel into a pressure regulation valve (PRV) and directing via the PRV a downstream flow of the un-burnt fuel towards the reservoir based on demand requirements of the engine, the PRV having an inlet for receiving the flow of the un-burnt fuel from the fuel supply line upstream of the metering valve and another inlet for receiving the bypass flow of the un-burnt fuel from the fuel supply line downstream of the metering valve.

18. The method of generating electrical power as claimed in claim 17, wherein directing via the PRV the downstream flow of the un-burnt fuel towards the reservoir includes redirecting the downstream flow of the un-burnt fuel to the turbine, and wherein creating power with the turbine includes propelling the turbine via the downstream flow of the un-burnt fuel and transferring power from the turbine to a generator that outputs electrical power.

* * * * *